United States Patent
Wilson-Jones et al.

(10) Patent No.: US 6,211,631 B1
(45) Date of Patent: Apr. 3, 2001

(54) ELECTRICAL POWER-ASSISTED STEERING SYSTEMS

(75) Inventors: Russell Wilson-Jones, Warwickshire; Steven John Horton, West Midlands; John Michael Ironside; Mark Anthony Wilkes, both of Birmingham; Michael Appleyard, Lancashire, all of (GB)

(73) Assignee: Lucas Industries public limited company, Solihull (GB)

(*) Notice: Subject to any disclaimer, the term of this patent is extended or adjusted under 35 U.S.C. 154(b) by 0 days.

(21) Appl. No.: 09/458,486

(22) Filed: Dec. 9, 1999

Related U.S. Application Data (62) Division of application No. 09/068,746, filed as application No. PCT/GB97/02446 on May 13, 1998.

(30) Foreign Application Priority Data

Sep. 13, 1996 (GB) .................................................. 9619175

(51) Int. Cl.[7] ...................................................... H02K 7/10
(52) U.S. Cl. ............................................. 318/12; 180/444
(58) Field of Search .................................. 180/443–446; 318/9–14, 15, 432–434

(56) References Cited

U.S. PATENT DOCUMENTS

| | | | | |
|---|---|---|---|---|
| 4,128,046 | * | 12/1978 | Rosell | 91/375 |
| 4,204,817 | * | 5/1980 | Kervagoret | 91/375 |
| 5,573,079 | * | 11/1996 | Suda et al. | 180/444 |

FOREIGN PATENT DOCUMENTS

| | | |
|---|---|---|
| 0 508 250 A1 | 10/1992 | (EP) . |
| 2 188 599 | 10/1987 | (GB) . |
| 2 297 067 | 7/1996 | (GB) . |
| WO 97/18119 | 5/1997 | (WO) . |

OTHER PUBLICATIONS

Connor, B., "Elektrische Lenkhilfen für Pkw als Aternative zu hydraulischen und elektro–hydraulischen Systemen (Electric Power Assisted Steering—An Alternative to Hydraulic and Electro–hydraulic Systems)," *ATZ Automobiltechnische Zeitschrift* 98 (1996), pp. 406–408, 410.

* cited by examiner

*Primary Examiner*—David Martin
(74) *Attorney, Agent, or Firm*—Christensen O'Connor Johnson Kindness PLLC (57) ABSTRACT

An electrical power-assisted steering system is disclosed comprising a brushless electric motor (1) which has a plurality of phase windings connected at a start point and in which a switching means (13) such as a relay is provided in at least one phase of the motor, the switching means being movable between a closed position in which current is able to flow in the phase winding and an open position which prevents current flowing in the respective phase in the event of a fault. Also disclosed is a substantially rigid connector assembly (19) onto which is mounted the switching means (13), conductors (20) for connecting the motor phase windings and a motor position sensor (21) to an associated motor control means (6), the connector acting as a support for the motor stator, which simplifies the steps involved in assembly. In another aspect of the invention, the electrical power-assisted steering system includes a one-piece casing (3) which acts as a housing for the gearset, torque sensor, control means and at least part of the motor.

19 Claims, 7 Drawing Sheets

ELECTRICAL POWER-ASSISTED STEERING SYSTEMS

This a division of prior application No. 09/068,746, filed May 13, 1998, which was the United States national stage of International application No. PCT/GB97/02446, filed Sep. 11, 1997, the benefit of the filing dates of which are hereby claimed under 35 U.S.C. § 120, which in turn claims the benefit of British application No. 9619175.4, filed Sep. 13, 1996, the benefit of the filing date of which is hereby claimed under 35 U.S.C. § 119.

This invention relates to an electrical power-assisted steering system for a vehicle of the kind comprising an electric motor connected through a gearbox to act on a steering mechanism of the vehicle. For example, the gearbox may provide a connection between the motor and a steering column shaft, or directly onto a portion of a rack and pinion mechanism forming part of the steering mechanism.

The electric motor is used to assist a driver in applying torque to the steering mechanism, by applying an assistance torque of the same sense, to make it easier to turn the steering wheel, for example during parking manoeuvres. Thus, operation of the motor may assist in rotating the steering column shaft, or moving a portion of the steering rack mechanism. Of course, the motor may be connected to any part of any typical steering mechanism as long as it can provide an assistance torque to aid the driver in turning the steering wheel.

The motor, which may be a multi-phase brushless star-connected permanent magnet motor, is controlled by motor control means comprising control and drive circuits, which is operative to supply a current from a power supply to the motor phase windings. The phase windings of the motor are connected at a star point. Each phase is connected to a positive terminal of the power supply by a top transistor, and to a negative terminal by a bottom transistor, the two transistors defining an arm of a multiple arm bridge. This bridge forms the drive circuits, while the control circuits are provided by a microprocessor or digital signal processor or analogue signal processing or some combination thereof. The microprocessor is operative in response to signals from a torque sensor provided on the steering column to measure the torque applied by the driver, from a motor rotor position sensor providing information about motor speed and direction and optionally from signals corresponding to current flowing in the motor bridge or power supply. This information can be used in combination with the torque sensor signal and/or column position sensor signal to determine which phase winding should be energised and when. The microprocessor produces control signals which energise the transistors of the drive circuits to cause current to flow in a desired motor phase.

A problem with this electrical power-assisted steering system is that a fault occurring in the motor drive or control circuits can cause an error condition which is unacceptable in a vehicle steering system, where safety is critical.

For example, suppose that a top transistor in one arm of the bridge is energised in error while a bottom transistor in another arm of the bridge is also energised in error. This fault would result in a phase of the motor becoming permanently energised and cause the motor to become permanently attracted to a particular position, tending to clamp the steering column in position and resist rotation. This would be readily apparent to the driver, and is clearly undesirable. This situation could occur if the microprocessor is at fault, or if a short circuit occurs across the transistors.

One known solution to this problem is to provide a clutch between the motor and the steering column. The clutch, typically a dog or friction clutch, is normally engaged but in the event of a fault being detected, the clutch is operated to disengage the motor from the steering column. However, the clutch is costly and bulky, and additional test procedures must also be incorporated to check that the clutch can still be disengaged should it be necessary to do so, which again adds to the cost and is time consuming.

Another solution is to provide a means for isolating the motor drive circuitry from the power supply in the event of a failure, for example by providing a relay between the supply positive terminal and the drive circuitry. This removes the drive current from the motor but is not without its problems. Because the phase windings are still connected together and connected to the drive circuitry, an electrically conducting path could still be present around the bridge (i.e. through two short circuited transistors and two phase windings). Then, on rotation of the motor shaft drive due to rotation of the steering column, a back EMF is produced in one or more of the windings. As a result of this EMF and the complete electrical path around the bridge, a substantial current can flow through the motor phase windings which produces a torque in the opposite sense to the rotation of the motor shaft. This resisting torque is highly undesirable because in this case, not only is steering assistance lost due to disconnection of the power supply, but a resisting torque is then applied which makes turning the steering column difficult.

In accordance with a first aspect of the present invention, in an electrical power-assisted steering system for a vehicle of the kind set forth, the electric motor is a brushless motor having a plurality of phase windings connected at a star point, and a switching means is provided in at least one phase of the motor, the switching means being movable between a closed position in which current is able to flow in the phase winding, and an open position which prevents current flowing in the respective phase winding of the motor.

The switching means ensures, if a fault condition arises, that the motor does not provide a resisting torque to the movement of the steering column because no current flows in the phase winding. This means that no clutch is required. Secondly, the switching means, when open, prevents the back EMF generated by the movement of the motor rotor from producing a current in the winding as the phase is connected to an open circuit and so no current can flow. This is true regardless of the nature of the fault in the motor or the drive circuitry.

Preferably, the switching means comprises a switch or relay which is connected in series between an end of the phase winding and the motor drive circuitry. Alternatively, the switching means may comprise a switch or relay which is provided at the star point of the motor and opening of the switching means isolates the phase winding from the star point.

A separate switching means may be provided in each phase of the motor to allow each phase to be isolated from the star point independently. The switching means may comprise a solid state relay, but any suitable isolating switch could be used.

In a preferred embodiment, the electric motor comprises a 3-phase motor and the switching means comprises a pair of relay contacts operated by a single relay coil so that two of the three phases can be isolated from the third phase which is common to both relay contacts.

A further problem with electrical power-assisted steering systems of the kind set forth arises due to the need to connect the motor phase windings to the motor control means and power supply.

In order to reduce bulk, cost and EM radiation emissions an electrical power-assisted steering system requires that the drive circuitry, motor and gearbox are housed in close proximity to each other. In one known system the drive circuitry is mounted onto a printed circuit board (PCB) which is then fixed near to the motor, for example inside the gearbox housing. The motor windings are then connected to the PCB using flying leads. However, flying leads are undesirable because they can become tangled up with a rotary part of the motor or gearbox due to the confined space, and they are time consuming to connect. The provision of the relay to isolate phase windings, where required, also imposes problems of mounting and adds to assembly time as it requires extra leads.

In accordance with a second aspect of the present invention, in an electric power assisted steering system of the kind set forth, a connector assembly connects the electric motor to an electronic circuit, the connector assembly comprising a substantially rigid frame which is adapted to support a plurality of conducting tracks which provide a connection between phase windings of the motor and the electronic circuit.

By providing the rigidly supported conducting tracks as a connector assembly between the motor winding and the electronic circuitry, the problems associated with loose flying leads are eliminated. In particular, the rigid support of the tracks means that it is possible to position the tracks close to the moving parts of the motor and gearbox without fear of contact between the two. Assembly time is also reduced as it is possible to connect the tracks to the motor phase windings and then to the electronic circuitry in a simple manner.

The conducting tracks may be substantially rigid in their own right, or may be flexible but rigidly supported by the rigid frame. The tracks may also have legs which project out of the rigid frame to facilitate direct connection with the electronic circuitry which is sited remotely from the motor.

Preferably, the electronic circuit comprises the motor control means, comprising the drive and control circuits which are housed within a first portion of a gearbox housing and the connector assembly and motor are accommodated at least partially within a second portion of the gearbox housing. In this case the legs of the conducting tracks are adapted to protrude through one or more openings provided in a wall of the gearbox housing so as to allow connection to the control circuitry. Most preferably, at the point where the legs of the conducting tracks pass through the openings they are surrounded by an insulating portion of the rigid frame to prevent accidental electrical contact with the housing wall. The rotor can protrude through a further opening in the wall of the housing for engaging with the gears contained in a third portion of the gearbox housing. A lid may be provided for sealing the PCB in the first part of the housing after assembly.

The rigid frame and conducting tracks may be in the form of a lead frame or may comprise a printed circuit board. Alternatively, a multiple layered printed circuit board may be used. The rigid frame could be of an electrically insulating material such as a plastics material, and may be moulded.

The rigid frame may also act as a support for the motor stator, to assist in securing or locating the motor to the housing. This could be achieved by providing engagement means on the frame which cooperates with complementary engagement means on the motor to ensure correct alignment between the motor and the conducting tracks.

The rigid frame may also provide a mounting for a motor rotor position sensing means, which, for example, may comprise a plurality of Hall effect sensors which detect the magnetic field of the motor rotor. Because the motor stator position can be fixed relative to the rigid frame, the correct position of the sensors relative to the stator can be assured. The frame provides a simple way of mounting the sensing means accurately.

It is also advantageous for the connector assembly to provide a mounting for a switching means (i.e. a relay) which is used to isolate the motor phases in the event of a motor failure. This enables the relay to be provided close to the motor phase connections, ensuring low resistance and minimising path lengths to increase safety. Again, the conducting tracks for connecting the relay to the phase windings, can be provided on the connector assembly.

In a preferred embodiment, the connector assembly comprises a moulded rigid frame of a substantially cylindrical form, and is secured to the gearbox housing to be arranged substantially concentrically with a circular cut-out in the side of the gearbox housing. When in position, the rigid frame lies entirely within the second portion of the gearbox housing. The rigid frame is prevented from rotation within the second portion by lugs provided around its perimeter. On a face of the rigid frame opposite to the face on which the motor is secured, the conducting tracks for the phase windings and the conducting tracks for the rotor position sensor are formed into the legs which project axially away from the motor to pass through openings in the gearbox housing into the first portion of the housing for connection to the PCB carrying the drive and control circuits.

According to a third aspect of the present invention, an electrical power-assisted steering system of the kind set forth includes a one-piece housing accommodating at least a part of the electric motor, electronic circuits adapted to control and drive the electric motor, a connector assembly having conducting tracks connecting the motor to the electronic circuits, the gearbox and a torque sensor.

The one-piece housing is especially suitable for use with a connector in accordance with the second aspect of the invention, as there is no need to provide routing for flying leads as in the prior art.

The housing may be of metal or plastics material. Preferably, the housing comprises three integral portions; a first portion which houses the electronic circuits, a second portion which houses at least part of the motor (ie the stator and/or armature) and a connector assembly, the second portion being sealed with an end cap, and a third portion which houses the gearbox and the torque sensor. The second portion may form at least a part of the casing for the electric motor, eliminating the need for a separate motor casing.

The one-piece housing provides a compact, low cost housing for all the essential components of the electrical power-assisted steering system. Furthermore, because the torque sensor is accommodated in the housing, the number of separate components is reduced. The torque sensor may also be provided with a connector assembly. The first, second and third portions may define cavities which accommodate various parts of the electrical power steering system to isolate the parts in one cavity from those in another. For example, this provides shielding of the electronic circuits in one portion of the housing from the motor which is housed in another portion of the housing.

The second and third aspects of the invention mean that the construction and the assembly of the motor, gearbox and electronic circuit can be greatly simplified. For assembly, the motor stator is secured to the rigid frame. The frame and motor stator are then pressed into the second part of the gearbox housing with the conducting tracks protruding into the first portion of the housing. The rotor can then be inserted through the stator to pass through the hole in the wall of the housing to engage the gearbox in the third portion of the housing. The torque sensor is also inserted into the housing. Finally, the control and drive circuit PCB is inserted into the gearbox housing so that the conducting tracks align with the tracks on the PCB, and the tracks are soldered together to complete the circuit. It will thus be appreciated that the efficiency of assembly is greatly improved. Because the PCB, gearset and motor are all contained within separate portions of the housing, electromagnetic immunity is good and the circuits are well protected from environmental effects.

There will now be described a preferred embodiment illustrating the various aspects of the invention, with the aid of the following drawings, in which.

Figure 1:
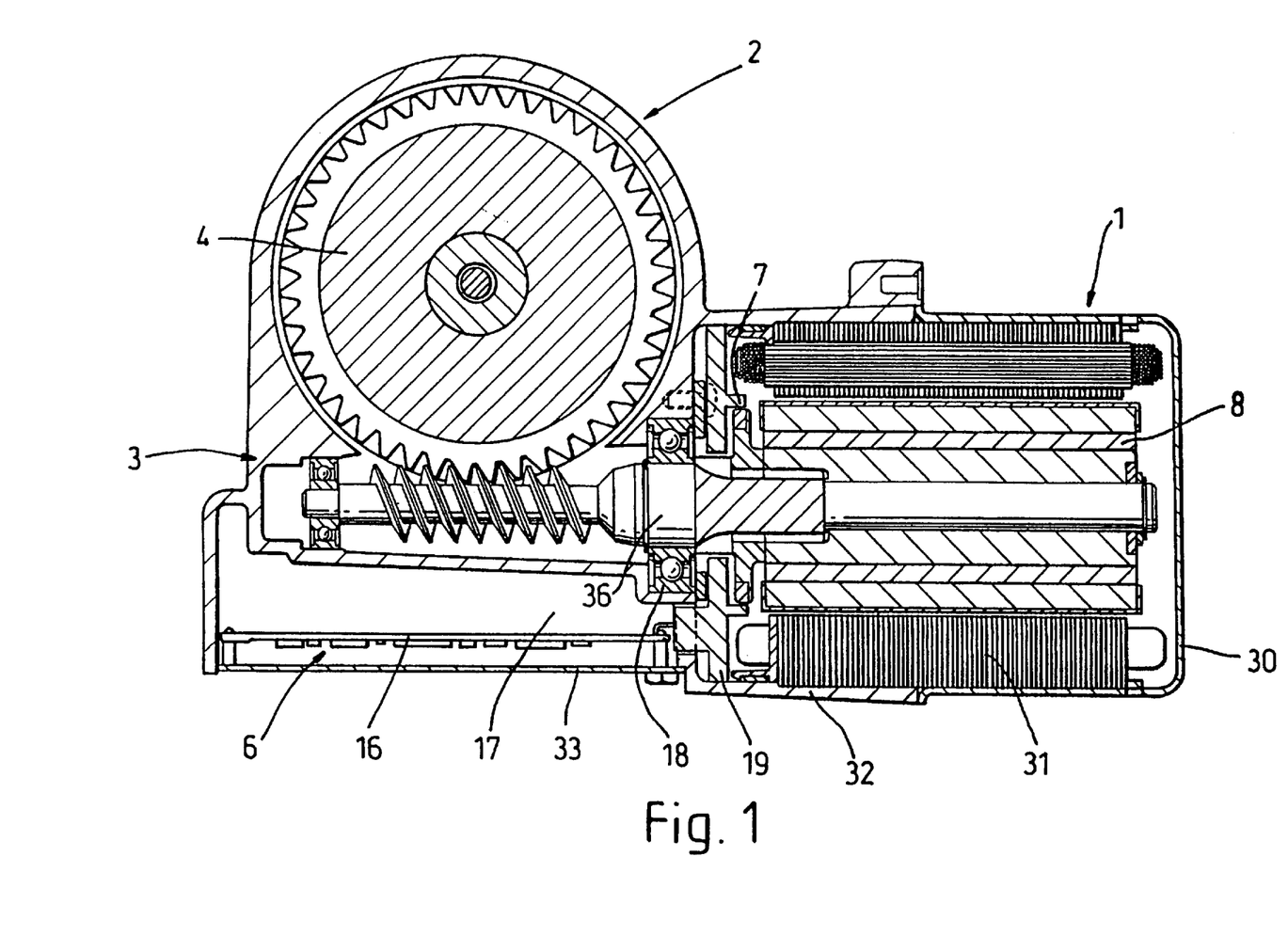
FIG. 1 shows a part of a EPAS system having a motor to which the present invention is applicable.

FIG. 1 illustrates a part of an electrical power-assisted steering (EPAS) system for use in a vehicle. The system shown comprises a threephase brushless permanent magnet DC motor 1 which is connected via a gearbox gearset 2 housed in a one-piece housing 3 to a steering column 4. A torque sensor (not shown in FIG. 1) provided on the input side of the steering column 4 provides a measure of the torque applied by the driver of the vehicle, and the output from the torque sensor is used to control the electric motor via a motor control means including a control circuit and drive circuit 6. In addition to the torque sensor, a motor rotor position sensor 7 is provided which comprises a set of three Hall effect sensors which can detect the position of the magnetic rotor 8, or the position of magnets mounted on the rotor.

Figure 2:
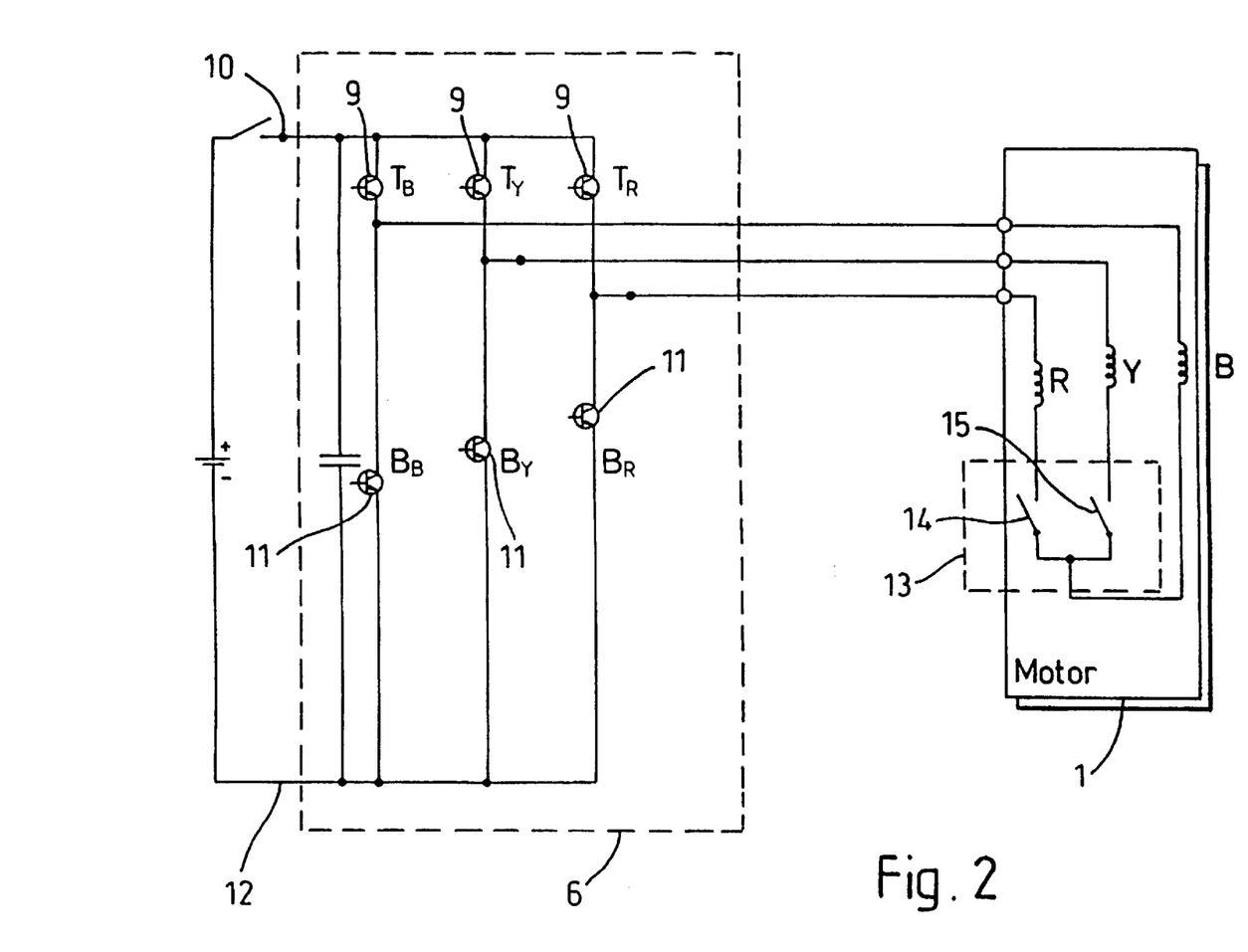
FIG. 2 is a partial circuit diagram of an electric motor and its associated drive circuitry which is in accordance with a first aspect of the present invention.
Figure 3:
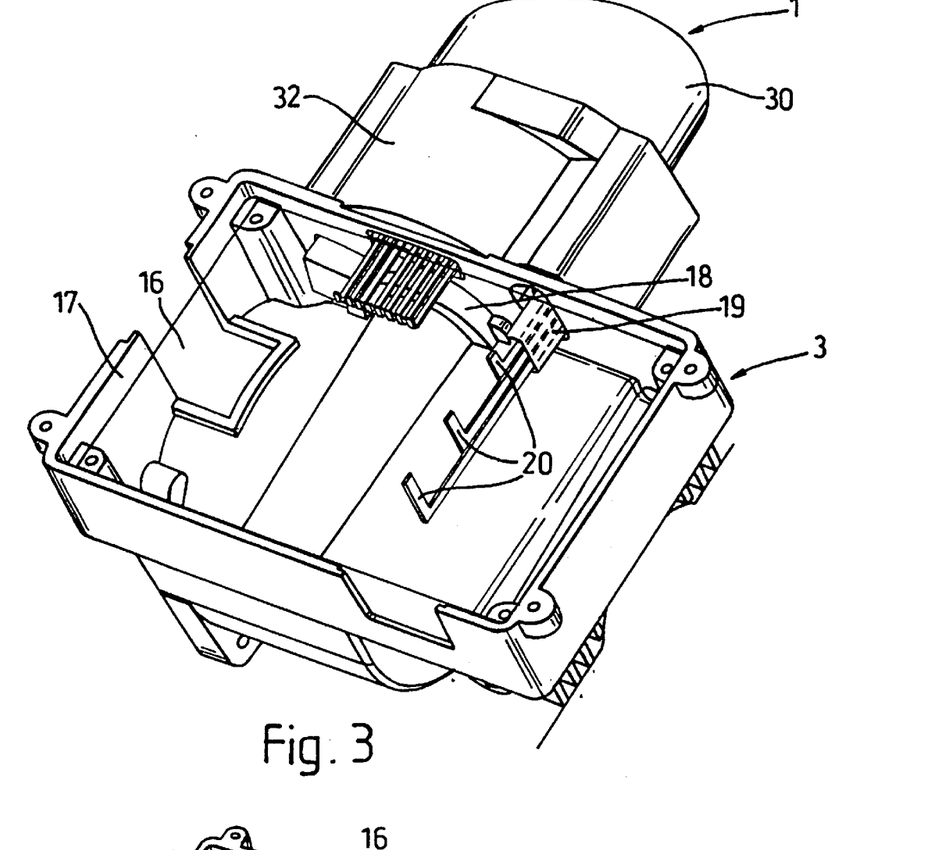
FIG. 3 is a view of the gearbox housing, electric motor and the connector assembly supporting the conducting tracks after assembly of the system.

FIG. 2 illustrates the electrical equivalent circuit of the brushless motor 1 and the drive circuit 6. The drive circuitry comprises a three phase bridge, with each phase of the bridge having a top transistor 9 connected between the first end of a respective phase winding (R,Y,B) and a positive supply terminal 10, and a bottom transistor 11 connected between the first end of the respective phase winding and a negative supply terminal 12. Each of the transistors is shown as a single power transistor, which may be of the FET or bi-polar type. The transistors are energised or de-energised by an electronic drive circuit (not shown) in response to signals generated by a micro controller (not shown) which receives the output signals from the torque sensor and motor position sensor 7.

In this embodiment a relay unit 13 is provided at the star point of the electric motor. The relay unit as illustrated has two contacts 14,15 driven by a single relay coil although the relay unit may comprise two discrete relays each with its own coil to allow independent control of each phase winding. Normally, the relay is opened so that all the phases are connected together at the star point.

In the event that a fault is detected which would lead to incorrect operation of the electric motor the relay is de-energised and the contacts are opened so that each of the phase windings is isolated from each other phase winding and from the winding that is common to the relay contacts. This prevents back EMF generated by movement of the steering column (and hence motor rotor) from finding a low impedance path through the control circuit and prevents electrical damping from arising.

Also shown in FIG. 1 is a connector assembly which is in accordance with the second aspect of the invention. The motor control means 6 for driving the motor is provided on a PCB 16 which is accommodated within a first portion 17 of the one-piece gearbox housing 3, and the motor is provided on the outside of the first portion of the gearbox housing with the motor output shaft operating within bearings 18 keyed to the gearbox housing for stability. This arrangement of components has been found to be advantageous because it results in a low overall size and ensures that the distance between the control circuitry and the motor stator is minimised.

Located between the electric motor 1 and the gearbox housing is a connector assembly 19 which comprises a rigid support for the electrical connections 20 between the motor 1 and drive circuitry. The connector assembly 19 is preferably in the form of a PCB or a lead frame (i.e. a set of conductors held together and located in their environment by a plastics moulding).

Figure 4:
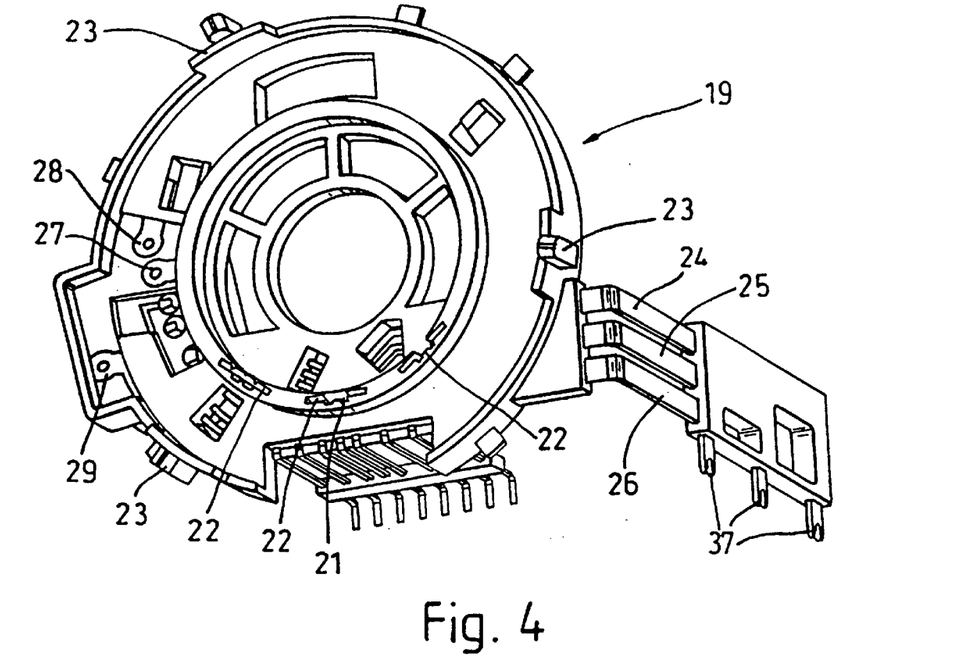
FIGS. 4 and 5 are two different views of a connector assembly in accordance with the second aspect of the present invention.
Figure 5:
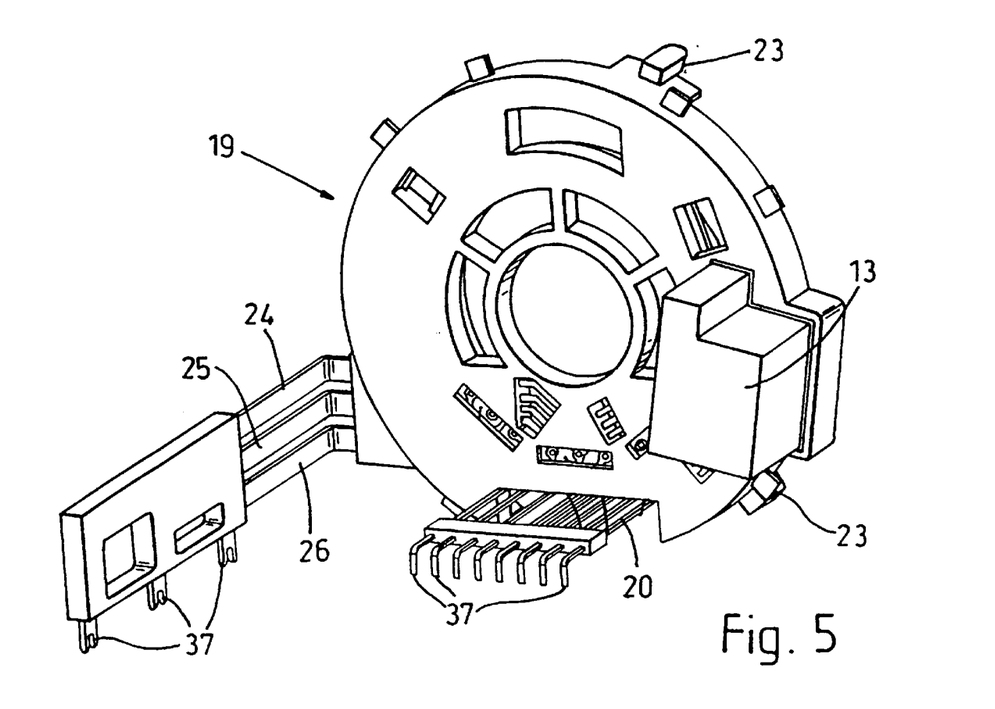

FIGS. 4 and 5 illustrates a preferred embodiment of the connector assembly. The connector assembly serves as a mounting for the motor rotor position sensors 21 which fit in recesses 22 moulded into the frame and can incorporate a shielding ring of material (not shown) which helps to isolate the Hall effect sensors from external electromagnetic interference.

The connector assembly 19 also provides support for the electric motor 1 and its stator windings. The rigid frame includes engagement means 23 which helps to ensure accurate alignment of the motor rotor position sensors relative to the stator windings. The connector assembly 19 also supports the relay 13 which is in accordance with the first aspect of the invention.

Figure 6:
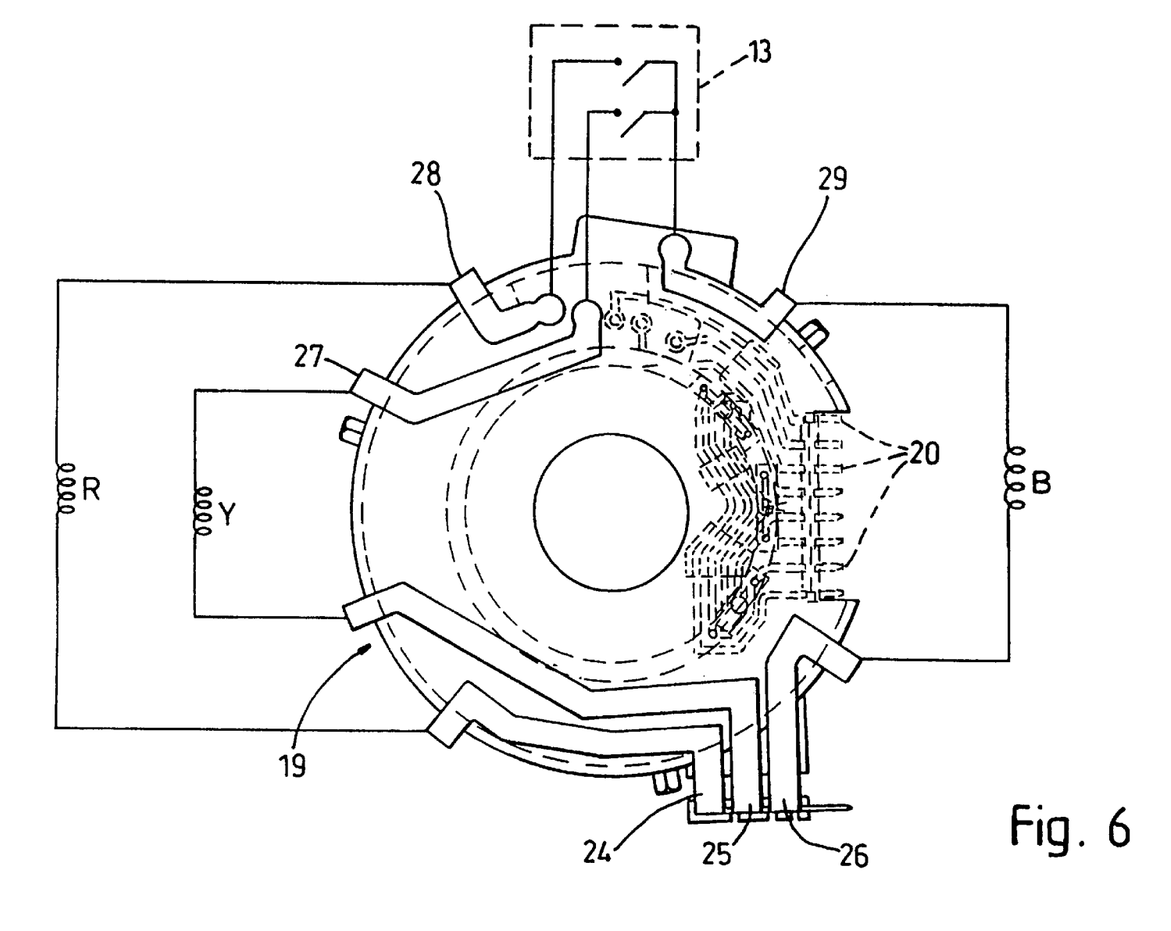
FIG. 6 is an illustration of the layout of the conducting tracks carried by the rigid frame of the connector assembly and the connections from the tracks to the relay and motor phase windings.
Figure 7:
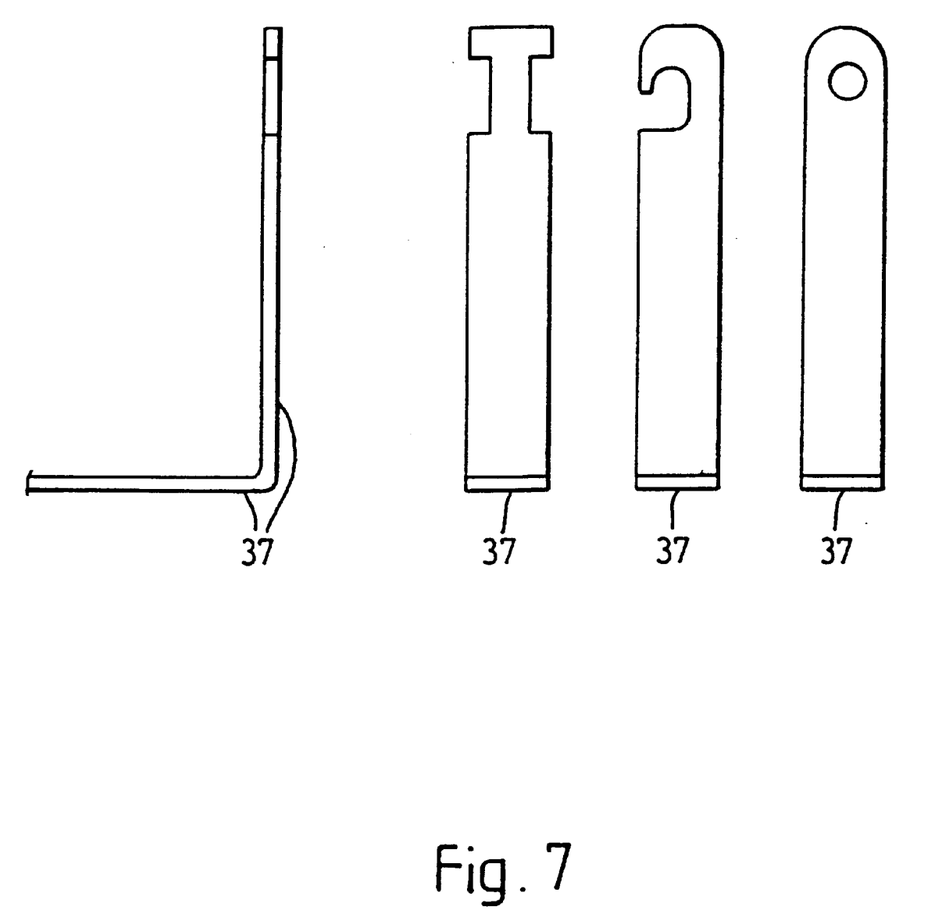
FIG. 7 is a view of several possible terminal posts which can be formed on the end of the conducting tracks.

FIG. 6 illustrates the electrical conducting track arrangement of the connector assembly 19. The tracks 24,25,26,27, 28,29 provide a connection between the motor phase windings, the relay 13 and they are arranged on the rigid frame so as to have the shortest path length possible to minimise resistance. The ends of the tracks which connect to the motor phase windings are formed into termination posts by bending the tracks. FIG. 7 shows a variety of possible types of terminal post 37 which can be formed. The motor phase windings, which typically comprise several strands of varnished copper wire that is wound around stator poles can typically be connected to the posts by wrapping, soldering or welding.

The recesses 22 provided on the connector assembly retain magnetic sensors 21 that detect the direction of the magnetic field of either the rotor magnets or a set of dedicated sensor magnets attached to the motor rotor shaft, and the connector assembly provides a support for the associated sensor wiring by way of conducting tracks similar to those used to connect to the motor windings.

As mentioned previously, the relay 13 is also mounted on the connector assembly 19. It is preferable to mount the relay on the connector assembly as close as possible to the motor phase winding terminals because this offers a compact arrangement, the elimination of the requirement for external connections which enhances safety, and a minimised conductor length offers a low resistance.

The connector assembly of the preferred embodiment therefore comprises a substantially rigid plastics moulding which supports termination posts for the phase windings, mounting locations for the position sensors, a mounting location for the isolating relay and conducting paths from the windings to the relay, from the windings to the control circuitry and from the sensors to the control circuitry.

In order to facilitate connection between the phase windings and sensors and the control and drive circuitry, the conducting tracks 20 are formed at one end into legs which extend away from the main body of the connector assembly and are terminated with individual upturned legs 37 as shown in FIGS. 5 and 6. The motor phase conductors (high current) and the sensor conductors (low current) are split into two groups.

Figure 8:
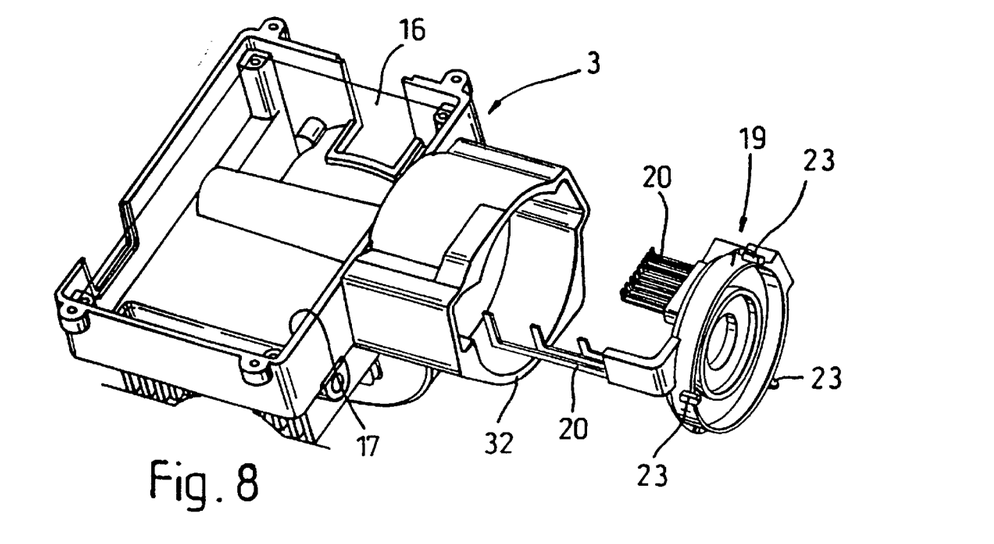
FIG. 8 is a view of the gearbox housing and connector assembly prior to assembly.
Figure 9:
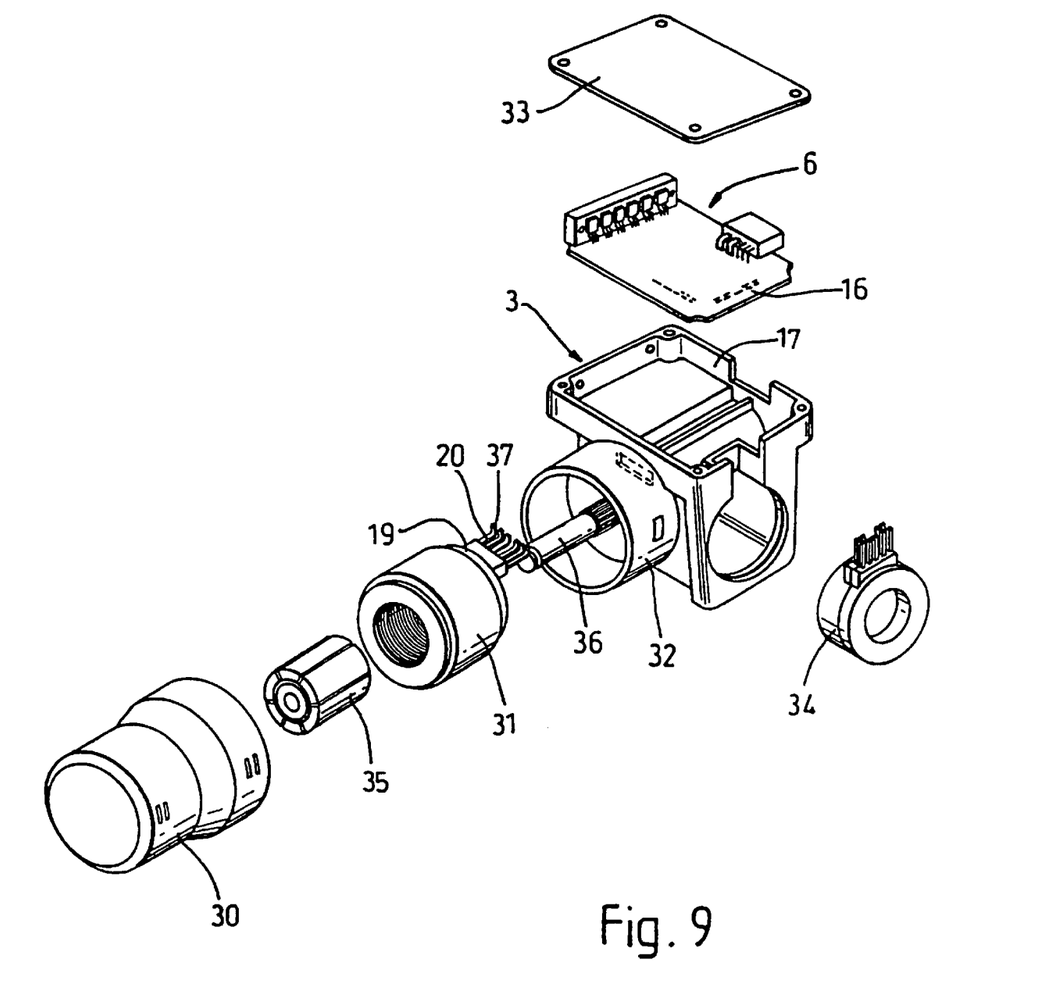
FIG. 9 shows an exploded view of a complete electrical power assisted steering assembly using the one-piece housing of the third aspect of the invention.

The method of assembly of the motor, connector assembly 19, torque sensor 34 and electrical circuitry 6 with the gearbox housing 3 will now be described with reference to FIGS. 8, 9 and FIG. 1.

Initially, the motor stator windings are connected to the terminal posts provided on the connector assembly. The motor rotor position sensors are also put in place in the recesses, and the stator assembly is fixed to the connector assembly. Engaging lugs on the connector assembly co-operate with recesses on the motor stator assembly (not shown), and this ensures that the stator is correctly located relative to the sensing elements.

The connector assembly 19 and motor stator 31 are then inserted into a second portion 32 of the gearbox housing 3, and are fixed in place by a bolt (not shown) which protrudes through the rigid frame of the connector into a captive thread in a wall of the gearbox housing. In this position, the conducting tracks protrude through openings in the gearbox housing as shown in FIG. 9. The motor armature 35 and shaft 36 are then inserted into the motor stator 31 until a worm gear on the end of the rotor 36 engages with a gear wheel in the gearbox housing 3. Finally, the electronic circuitry 6, which is provided on a separate PCB 16, is secured inside the gearbox housing 3 in a position so that the legs 37 on the end of the protruding terminal portions of the conducting tracks 20 of the connector assembly 19 pass through holes in the PCB. Connection between the PCB and the conducting tracks can then be achieved by directly soldering the terminal portions on the extended legs onto the tracks on the PCB to make the circuit complete. A motor end cap 30 can then be mounted around the exposed end of the motor to form a seal, and the lid 33 placed on the first gearbox portion to seal the electronic circuitry from the external environment if desired.

To summarise, the connector assembly 19 comprises a lead frame assembly which provides a rigid support for electrical conductors 20, a motor fault relay 13 and a motor position sensing means as well as providing a support for the electric motor 1 so that structurally the motor 1 and gearbox housing 3 form an integrated unit. This arrangement is preferred because it is compact, low-cost, reliable and minimises electrical resistance. It is compact because no additional connector blocks are required. It is low-cost because the rigid frame can be extended cheaply and no other components are required. It is reliable because the number of interfaces between the motor windings and the electronic drive circuitry and between the low current signals from the sensors and the control circuitry are minimised. Furthermore, all connections are mechanically robust, and the connection distances are short.

It will be appreciated that the switching means (the relay 13) of the first aspect of the invention could be used in electric motors used in other systems, where appropriate.

What is claimed is:

1. An electric power assisted steering system for a vehicle comprising an electric motor connected through a gear box to act on a steering mechanism of said vehicle wherein a one-piece housing accommodates at least a part of an electric motor, electronic circuits adapted to control and drive said electric motor, a connector assembly having conducting tracks connecting said motor to said electronic circuits, a gearbox and a torque sensors and wherein said housings comprises three integral portions, a first portion which houses said electronic circuits, a second portion which houses said part of said motor comprising a stator and an armature and accommodates said connector assembly, said second portion being sealed with and end cap, and a third portion which houses said gearbox and said torque sensor, and wherein said first, second, and third portions define compartments which are isolated from one another in use.

2. An electric power assisted steering system according to claim 1, wherein the housing is of metal.

3. An electric power assisted steering system according to claim 1, wherein the housing is of plastics material.

4. An electric power assisted steering system according to claim 1, wherein the second portion forms at least a part of the casing for the electric motor.

5. An electrical power assisted steering system according to claim 1, wherein a connector assembly connects the electric motor to an electronic circuit, the connector assembly comprising a substantially rigid frame which is adapted to support a plurality of conducting tracks which provide a connection between phase windings of the motor and an electronic circuit.

6. An electric power assisted steering system according to claim 5, wherein the conducting tracks are substantially rigid.

7. An electric power assisted steering system according to claim 5, wherein the conducts tracks are flexible but rigidly supported by the substantially rigid frame.

8. An electric power assisted steering system according to claim 5, wherein the tracks have legs which project out of the rigid frame to facilitate direct connection with the electronic circuit.

9. An electric power assisted steering system according to claim 5, wherein the electronic circuit comprises the motor control mean, comprising drive and control circuits which are housed within a first portion of a gearbox housing and the connector assembly and motor are accommodated at least partially within a second portion of the gearbox housing.

10. An electric power assisted steering system according to claim 9, wherein the legs of the conducting tracks are adapted to protrude through one or more openings provided in a wall of the gearbox housing.

11. An electric power assisted steering system according to claim 10, wherein the point where the legs of the conducting tracks pass through the openings they are surrounded by an insulating portion of the rigid frame to prevent accidental electrical contact with the housing.

12. An electrical power assisted steering system according to claim 9, wherein a lid is provided for sealing the connector assembly in the first part of the housing after assembly.

13. An electric power assisted steering system according to claim 5, wherein the rigid frame and conducting tracts are in the form of a lead frame or a printed circuit board.

14. An electric power assisted steering system according to claim 5, wherein the rigid frame and conducting tracks are in the form of a printed circuit board.

15. An electric power assisted steering system according to claim 14, wherein the printed circuit board comprises a multiple layered printed circuit board.

16. An electric power assisted steering system according to claim 5, wherein the rigid frame acts as a support for a stator of the motor.

17. An electric power assisted steering system according to claim 5, wherein engagement means are provided on the rigid frame which cooperates with complementary engagement means on the motor.

18. An electric power assisted steering system according to claim 5, wherein the rigid frame provides a mounting for a motor rotor position sensing means.

19. An electric power assisted steering system according to claim 5, wherein a mounting is provided on the connector for a switching means which is adopted to isolate the motor phases in the event of a motor failure.

\* \* \* \* \*